April 21, 1936. E. WYLIE 2,038,020
SHOCK ABSORBING COUPLING
Filed May 9, 1935
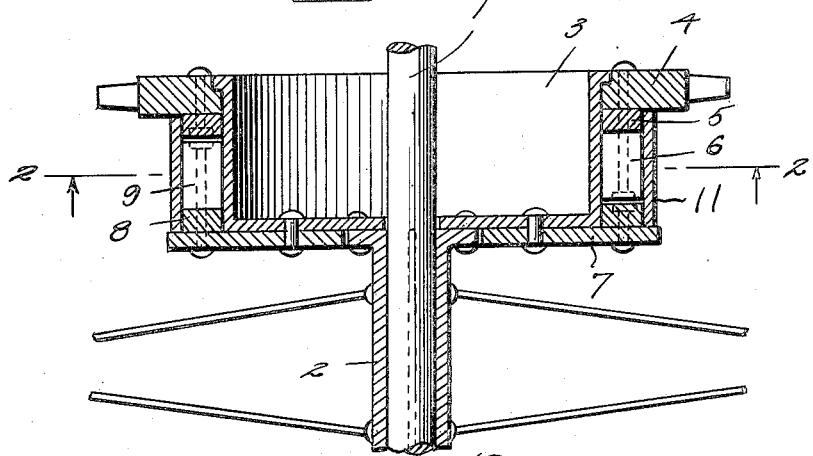
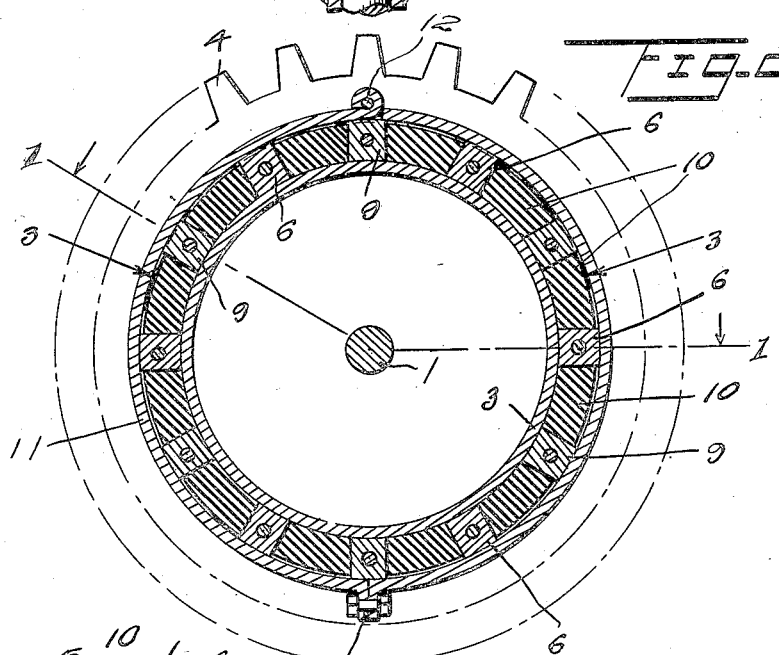
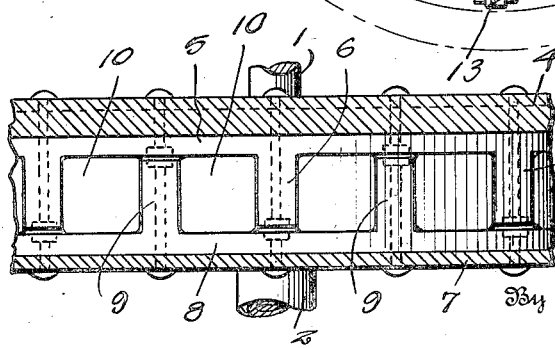
Inventor
Earl Wylie
By Watson E. Coleman
Attorney Patented Apr. 21, 1936

2,038,020

UNITED STATES PATENT OFFICE 2,038,020

SHOCK ABSORBING COUPLING

Earl Wylie, Bryantsville, Ky.

Application May 9, 1935, Serial No. 20,684

2 Claims. (Cl. 64—27)

This invention relates to improvements in mechanism for transmitting power and pertains particularly to shock absorbing mechanism.

The primary object of the present invention is to provide an improved coupling between a driving and a driven element whereby the shocks normally received by the driven element from the driving one incident to the starting up or stopping of the driving element are absorbed and prevented from reaching the driven element.

A still further object of the invention is to provide a novel mechanism for use between the power generating means of a wheeled structure such, for example, as a motorcycle and the axle of a supporting wheel thereof whereby the said axle will be protected against the shocks which it would normally receive when the power mechanism is started or shut off.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a sectional view taken on the line 1—1 of Figure 2.

Figure 2 is a sectional view taken on the line 2—2 of Figure 1.

Figure 3 is a plan view of the interconnected elements of the mechanism with the shielding housing removed and the gear and adjacent drum attached plate in the circumferential section indicated at 3—3 in Figure 2.

Referring to the drawing wherein like numerals of reference designate corresponding parts throughout the several views, the numeral 1 indicates the shaft or axle of a driven element such, for example, as a wheel of a motorcycle, the hub of which is indicated at 2 and shown mounted upon the axle. In wheeled structures of this character, there is usually coupled with the hub a drum 3 to which is attached a sprocket wheel 4. In the transmission of power from the sprocket wheel 4 to the axle, the sudden starting or stopping of the engine, which is connected with the sprocket wheel, transmits a shock or strain to the axle and wheel. The purpose of the present invention is to relieve this shock to the wheel by having it absorbed by an intervening body.

In carrying out the present invention, the sprocket wheel, which is in the form of an annulus surrounding the drum 3, has secured to the face thereof which is directed toward the adjacent wheel, the ring 5 with which is integrally formed the spaced fingers 6. This ring surrounds the drum 3, as illustrated in Figure 1. Secured to the side of the drum between the latter and the wheel is an annular plate 7 which has a peripheral portion projecting beyond the peripheral face of the drum and to this projecting portion of this plate is secured a ring 8 which is like the ring 5 and which surrounds the drum and has projecting across the same the fingers 9 which are integrally formed therewith and which are located each between a pair of fingers 6.

Interposed between the interleaved fingers of the two rings 5 and 8 are yieldable bodies 10 which are disposed upon the peripheral surface of the drum and which are preferably formed of rubber. These yieldable bodies 10 are maintained in place by the collar band 11 which is divided into two portions which are hingedly joined between two ends, as indicated at 12, and have their other two ends turned outwardly to form opposing ears which are joined by a nut or other suitable element, as indicated at 13.

From the foregoing it will be readily apparent that with the construction here illustrated, when power is applied to a sprocket chain which surrounds the sprocket wheel 4, to effect the rotation of the shaft 1, the fingers 6 will be moved with the initial movement of the sprocket wheel into firmer contact with the resilient bodies 10 adjacent thereto thus forcing these bodies into firmer contact with the fingers 9 which are connected through the plate 7 with the drum 3. The power thus applied to the sprocket gear will be transmitted through these yieldable bodies to the axle and in the event that the power is applied quickly or roughly, the shock which would ordinarily be transmitted to the axle and wheel will be absorbed by the resilient blocks.

I claim:—

1. A coupling comprising a cylindrical rotatable member having an integral out-turned flange about one end, an annular gear surrounding the member and retained against movement longitudinally in one direction by the flange, a plurality of fingers carried by the gear and extending axially of the member, an annulus about and secured to the member adjacent its other end, a plurality of fingers carried by the annulus and extending axially of the member between the first fingers, resilient bodies between and separating the fingers, and a divided band encircling the fingers and bodies to retain the latter in place having two ends hingedly connected and means separably connecting two ends.

2. A yieldable coupling, comprising a drum open upon one side and having an axle receiving aperture through the center of its opposite side, an outwardly extending circumferential flange integral with the drum at the edge adjacent the open side, said closed side of the drum being designed for attachment to the end of a wheel hub with said aperture concentric with the hub, an annular gear encircling the hub and having a recess in which said flange positions, the flange limiting axial movement of the gear in one direction on the drum, an annulus secured to the side of the gear opposite from the flange and encircling the drum, a plurality of fingers carried by the annulus and extending longitudinally of the drum, a second annulus encircling the drum at the end remote from the gear and secured to the drum, a plurality of fingers carried by the second annulus and directed toward the first annulus and disposed between the first fingers, a plurality of resilient bodies each resting upon the drum and disposed between a pair of fingers, an annular plate secured to the apertured end of the drum and having its periphery extended beyond the peripheries of the two annuli, and a band encircling and resting against the peripheries of the finger carrying annuli and retained against movement axially of the drum between said gear and annular plate.

EARL WYLIE.